(12) United States Patent
Skoglund

(10) Patent No.: US 8,160,208 B2
(45) Date of Patent: Apr. 17, 2012

(54) SYSTEMS AND METHODS FOR MONITORING TELEPHONE LINES

(75) Inventor: Kenth Skoglund, Linghem (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 902 days.

(21) Appl. No.: 12/200,138

(22) Filed: Aug. 28, 2008

(65) Prior Publication Data

US 2010/0054426 A1    Mar. 4, 2010

(51) Int. Cl.
*H04M 1/24* (2006.01)
*H04M 3/08* (2006.01)
*H04M 3/22* (2006.01)

(52) U.S. Cl. ........... 379/1.01; 379/26.01; 379/29.03; 379/29.1; 379/32.04; 379/413.02; 370/247; 370/252

(58) Field of Classification Search ........ 379/1.01, 379/26.01, 26.02, 27.01, 27.07, 29.03, 29.04, 379/29.05, 29.1, 29.11, 30, 32.01, 32.04, 379/33, 413.02, 413.03, 413.04; 370/241, 370/242, 247, 251, 252
See application file for complete search history.

(56) References Cited

U.S. PATENT DOCUMENTS

| | | | |
|---|---|---|---|
| 7,016,475 B2 * | 3/2006 | Resuta | 379/29.02 |
| 7,327,712 B2 * | 2/2008 | Fukui | 370/340 |
| 2003/0081735 A1 * | 5/2003 | Emory et al. | 379/1.01 |
| 2006/0178137 A1 * | 8/2006 | Loveland | 455/414.1 |
| 2007/0127713 A1 * | 6/2007 | Schley-May et al. | 379/413.02 |
| 2007/0242757 A1 * | 10/2007 | Schley-May et al. | 375/257 |
| 2007/0263775 A1 * | 11/2007 | Clark | 379/1.01 |
| 2009/0136021 A1 * | 5/2009 | Delva | 379/413.02 |

OTHER PUBLICATIONS

Silicon Laboratories, AN273, "GR-909 Testing with the Si321X PROSLIC", Rev. 0.1 Feb. 2006, 8 pages.

* cited by examiner

*Primary Examiner* — Binh Tieu
(74) *Attorney, Agent, or Firm* — Rothwell, Figg, Ernst & Manbeck, P.C.

(57) ABSTRACT

Systems and methods for monitoring a telephone line connected to a port of a voice gateway are described. In one embodiment, the method includes: obtaining a value representing an electrical characteristic of the port of the voice gateway; determining whether the value is within an acceptable range; determining whether a call originating from, or terminated at, a device connected to the telephone line completed successfully; and in response to determining that the call completed successfully, creating a new acceptable range based, at least in part, on the obtained value.

37 Claims, 7 Drawing Sheets

| Idle State | | Ringing State | | Transmission state | | Dialing State | |
|---|---|---|---|---|---|---|---|
| T_min | T_max | T_min | T_max | T_min | T_max | T_min | T_max |
| 3 | 5 | 4 | 7 | 3 | 6 | 3 | 5 |

| State | Previously Measured Values | | | | |
|---|---|---|---|---|---|
| Idle | v1 | v2 | v3 | v4 | v5 |
| Ringing | v1 | v2 | v3 | v4 | v5 |
| Transmission | v1 | v2 | v3 | v4 | v5 |
| Dialing | v1 | v2 | v3 | v4 | v5 |

SYSTEMS AND METHODS FOR MONITORING TELEPHONE LINES

TECHNICAL FIELD

The present invention relates to systems and methods for monitoring telephone lines connected to a port of a voice gateway.

BACKGROUND

It is becoming increasingly more common for small offices/home offices (SOHO environments) to deploy plain old telephone service (POTS) enabled customer premise equipment (CPE), which may also be referred to as a "voice gateway." In such environments, POTS port line tests must to be carried out locally, at the CPE, rather than from the local exchange as in the legacy technique.

Some CPEs support POTS line testing, but testing must be initiated from, for example, an operator or possibly an end user (subscriber). This assumes that the subscriber/operator is aware of a problem with a POTS-line. Since these problems often are dormant, the subscriber won't recognize a problem until he/she tries to use a phone connected to the CPE. The Telcordia GR-909-CORE specification describes a series of tests to be carried out on POTS-lines. However, the references used for comparison to determine whether there is a problem with a POTS-line are fixed, which can lead to excessive false positives and/or false negatives.

What is desired are improved systems and methods that overcome at least some of the above described disadvantages.

SUMMARY

In one aspect, the invention provides a method for monitoring a telephone line connected to a port of a voice gateway. In some embodiments, this method includes the following steps: obtaining a value representing an electrical characteristic of the port; determining whether the value is within an acceptable range; determining whether a call originating from, or terminated at, a device connected to the telephone line completed successfully; and in response to determining that the call completed successfully, creating a new acceptable range based, at least in part, on the obtained value. The electrical characteristic may be one of an impedance seen at the port, a current flowing into the port, and a voltage at the port.

The method may further include issuing an alarm in response to determining that the value is not within the acceptable range. The step of issuing an alarm may include activating a light source and/or a sound source. The step of determining whether the value is within the acceptable range may include comparing the value to a max threshold value and to a min threshold value The method may further include obtaining a second value representing the electrical characteristic at the port of the voice gateway after creating the new acceptable range; determining whether the second value is within the new acceptable range; and issuing an alarm in response to determining that the second value is not within the new acceptable range.

In some embodiments, the step of obtaining the value includes measuring the electrical characteristic while the telephone line is in an idle state, a transmission state, or a ringing state.

In some embodiments, the method further includes obtaining a plurality of values representing the electrical characteristic, wherein the step of obtaining the plurality of values includes obtaining a value representing the electrical characteristic at least once every X amount of time while the telephone line is in an idle state. The new acceptable range is preferable a function of the plurality of values. For example, the new acceptable range may be a function of the average of the plurality of values. In some embodiments, the new acceptable range is bounded by a max value and a min value, wherein the max value is equal to the average of the plurality of values plus a percentage of the average and the min value is equal to the average of the plurality of values minus a percentage of the average.

In another aspect, the invention provides an improved voice gateway. In some embodiments, this improved voice gateway includes: a telephone port for interfacing with an analog telephone line; a network port for interfacing with a network; a processing unit; and a circuit for monitoring the telephone port, wherein the circuit for monitoring the telephone port is configured to generate a value representing an electrical characteristic at the telephone port, and the processing unit is configured to: (1) receive the value and determine whether the value is within an acceptable range; (2) determine whether a call originating from, or terminated at, a device connected to the telephone port completed successfully; and (3) create a new acceptable range based, at least in part, on the value in response to determining that the call completed successfully.

The processing unit may be further configured to issue an alarm in response to determining that the value is not within the acceptable range.

The processing unit may be configured to determine whether the value is within the acceptable range by comparing the value to a max threshold value and to a min threshold value.

The processing unit may be further configured to obtain a second value representing the electrical characteristic at the port after creating the new acceptable range; determine whether the second value is within the new acceptable range; and issue an alarm in response to determining that the second value is not within the new acceptable range.

In other embodiments, the improved voice gateway includes: a port for interfacing with a telephone line; a circuit for generating a value representing an electrical characteristic at the port; and a processing unit coupled to the circuit, the processing unit comprising a storage unit storing a set of computer instructions, the set of computer instructions comprising: computer instructions for determining whether the value is within an acceptable range; computer instructions for determining whether a call originating from, or terminated at, a device connected to the telephone line completed successfully; and computer instructions for creating a new acceptable range based, at least in part, on the value in response to a determination that the call completed successfully.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 3 illustrates information used in monitoring a telephone line.

FIG. 4 illustrates data used to update a reference range.

DETAILED DESCRIPTION

In one aspect, the present invention provides an improved voice gateway for use in a home environment, SOHO environment or other environment. The improved voice gateway implements an automatic and adaptive method of POTS-line testing. For example, the voice gateway may, from time to time, measure an electrical characteristic of a POTS-line port while the port is in an idle state (as well as other states). For instance, the voice gateway may automatically and frequently measure an impedance seen at the port to obtain impedance values. After obtaining an impedance value, the gateway determines whether the value is within an acceptable range (e.g., a predetermined reference range). If the value is outside of the acceptable range, an alarm may be issued. In a preferred embodiment, the acceptable range is based on previous measurements (i.e., the reference range is adaptive). This adaptive method of line testing makes supervision of POTS-lines more reliable and sensitive to fault conditions. In some embodiments, the reference values are only allowed to vary within specified interval.

Figure 1:
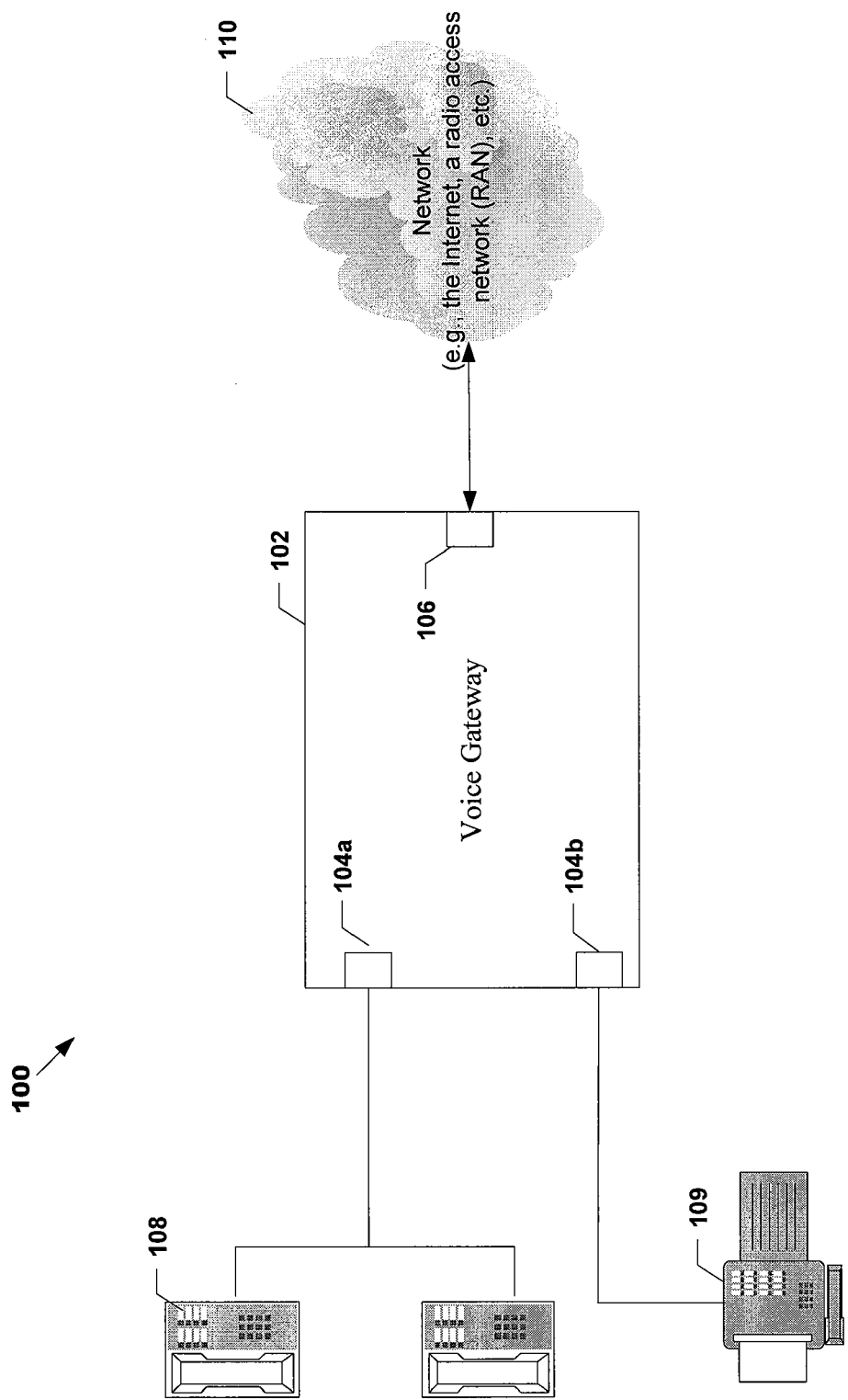
FIG. 1 illustrates an exemplary environment in which an exemplary voice gateway is deployed.

Referring now to FIG. 1, FIG. 1 illustrates an exemplary environment 100 in which an exemplary voice gateway 102 is deployed. As illustrated, voice gateway 102 provides a gateway to a network 110 (e.g., the Internet, a radio access network (RAN), or other network) via an interface 106 (e.g., an Ethernet interface, RAN interface or other interface). In the example shown, gateway 102 includes POTS-line ports 104 for interfacing with POTS devices 108 and 109. In the example, shown, device 108 is a POTS telephone and device 109 is a POTS facsimile machine. Of course, any POTS device (e.g., a POTS modem or other device) may connect to a POTS-line port 104 of gateway 102, and gateway 102 may have any number of POTS-line ports 104, as well as more than one network interface 106.

Figure 2:
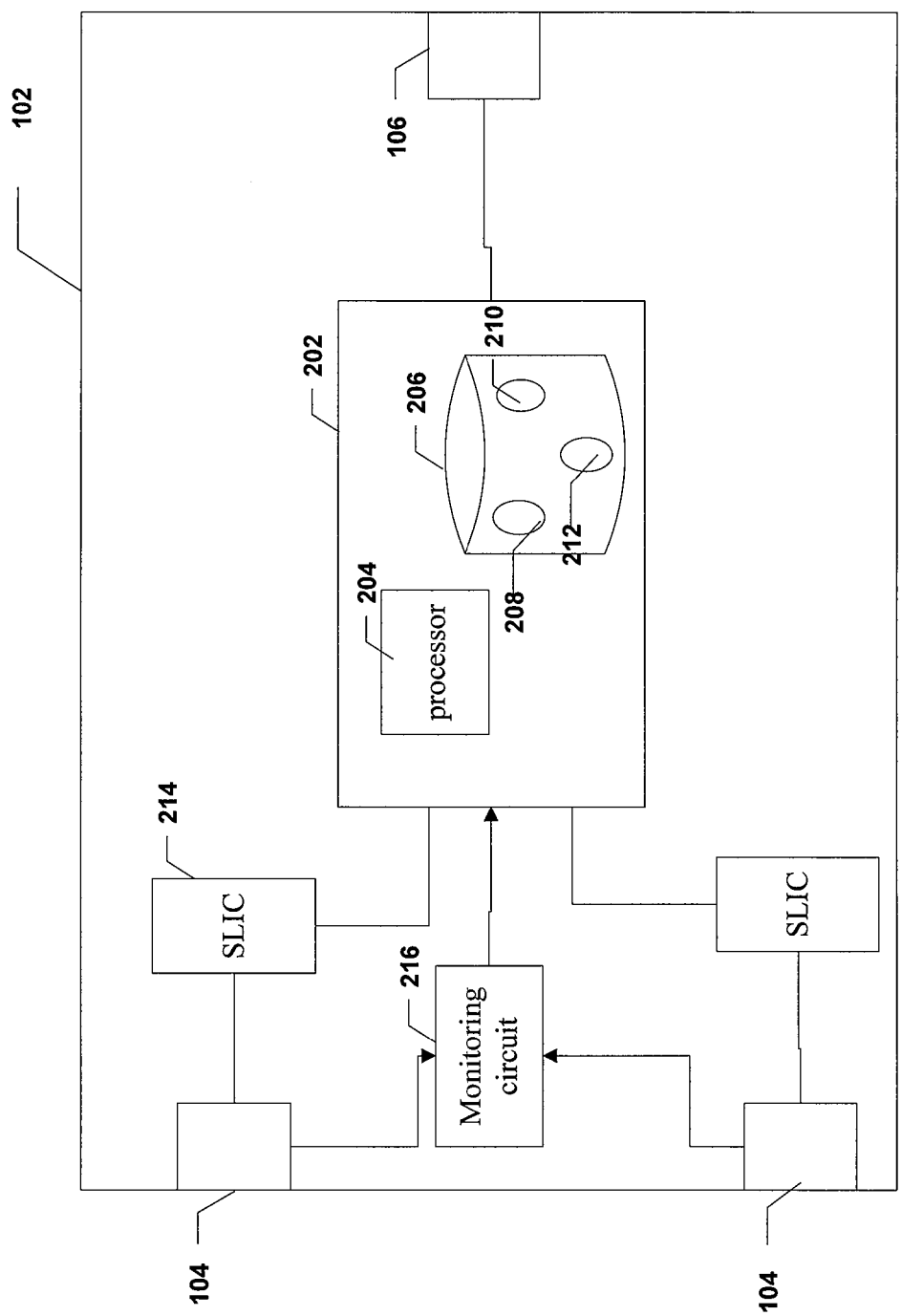
FIG. 2 is a functional block diagram of a voice gateway according to an embodiment of the invention.

Referring now to FIG. 2, FIG. 2 is a functional block diagram of gateway 102, according to some embodiments of the invention. In the embodiment shown, gateway 102 includes a processing unit 202 coupled to ports 104 and 106. As shown, processing unit 202 may be coupled to ports 104 via subscriber line interface circuits (SLIC) 214. Advantageously, gateway 102 includes one or more monitoring circuits 216 for monitoring the telephone lines connected to ports 104. For illustration purposes, monitoring circuit 106 is shown as being separate from SLICs 214, however, circuit 216 may be a component of a SLIC 214. Processing unit 202, as shown, may include a processor 204 (e.g., a microprocessor) and a data storage unit 206 (e.g., disk drive, flash memory, or other storage unit).

As described above, while a port 104 is in a certain state, gateway 102 may periodically measure an impedance seen at the port 104 (or other electrical characteristic of port 104) to generate an impedance a value representing the impedance seen at port 104. This function is performed by monitoring circuit 216. As also described above, after generating the value, gateway 102 determines whether the value is within a predetermined reference range. Accordingly, data storage unit 206 may store, for each port 104 and for each of a plurality of certain states, information 212 related to the reference range. Referring now to FIG. 3, FIG. 3 illustrates information 212, according to some embodiments, for a particular port 104. As shown in FIG. 3, for each of a plurality of certain states (e.g., idle state, ringing state, transmission state, dialing state), information 212 may include values that define the reference range for that state (e.g., threshold minimum and maximum values). Alternatively, instead of including a min and max value for each state, information 212 may include for each state a single value from which the min and max values can be derived.

As further described above, the reference range used for comparison for each of the certain states may be based on previous measurements made while the port was in the certain state. Accordingly, storage unit 206 may store, for each port 104 and for each of a plurality of certain states, a data set 210 that contains values generated from previous measurements. Referring now to FIG. 4, FIG. 4 illustrates a data set 210, according to some embodiments, for a particular port 104. As shown in FIG. 4, for each of a plurality of certain states (e.g., idle state, ringing state, transmission state, dialing state), data set 210 may include a data structure (e.q., a circular queue) that stores a plurality of values generated from previous measurements made while the port was in the certain state. In the example shown, for each certain state, the last five generated values are stored. Of course, more or less than five previous values may be stored for each certain state. Values stored in data set 210 are used to set the reference range for each certain state. For example, for a certain state, gateway 102 may determine the average of the values stored in the data structure associated with the certain state and use this average to set the min and max values for the reference range for the state.

Referring back to FIG. 2, storage unit 206 may also store one or more computer programs 208 ("software" 208). Software 208 includes computer instructions for performing the above described functions and for performing steps of the processes described below with reference to the flow charts shown in FIGS. 5-7.

Figure 5:
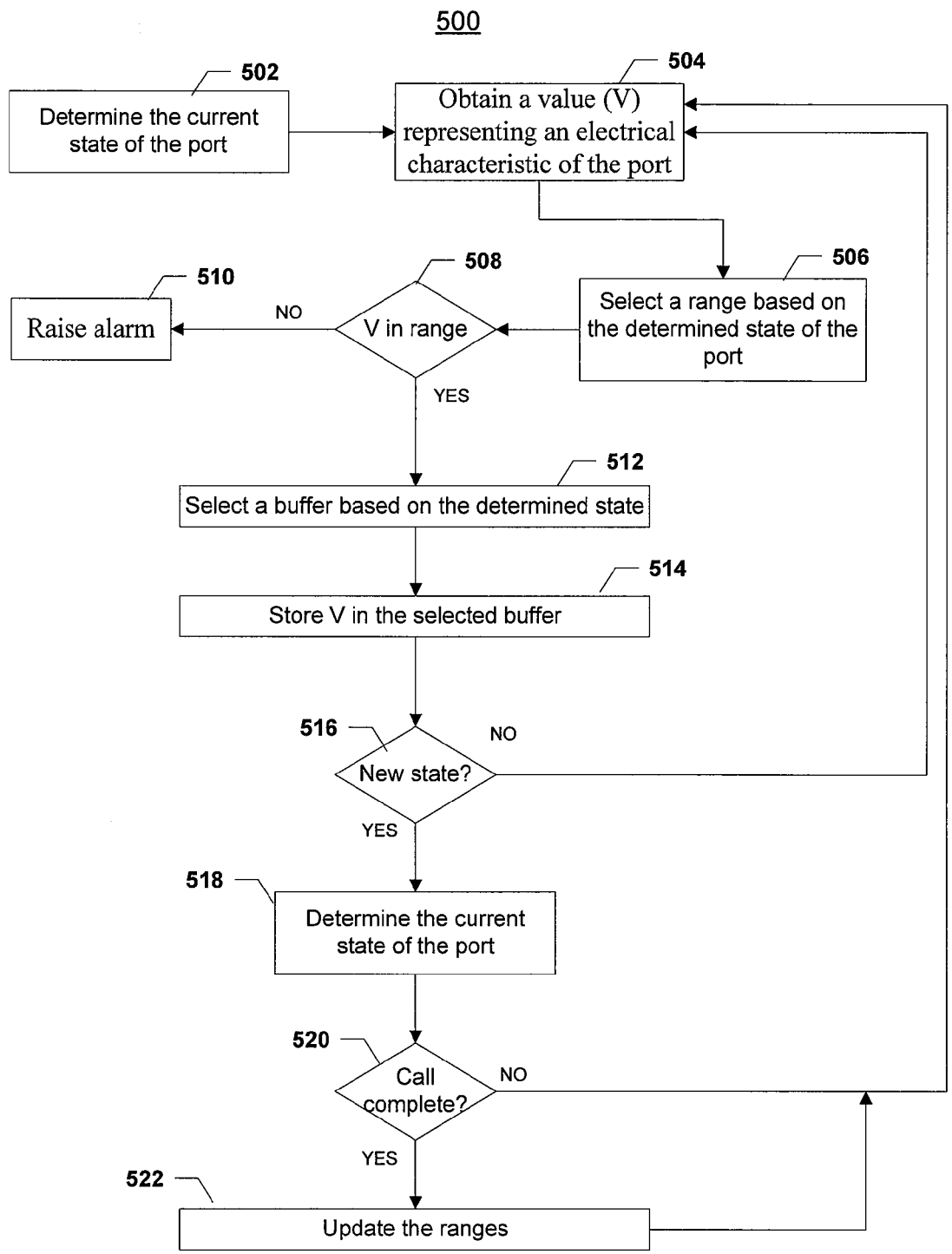
FIG. 5 is a flow chart illustrating a process for monitoring a telephone line according to an embodiment of the invention.

Referring now to FIG. 5, FIG. 5 is a flow chart illustrating a process 500, according to some embodiments, for monitoring a POTS-line port 104 of gateway 102. Process 500 may begin in step 502, where the current state of the port is determined. Next (step 504), a value (V) representing an electrical characteristic of the port is obtained. For example, processor 204 may obtain the value from monitoring circuit 216. The electrical characteristic may be one of an impedance seen at the port, a current flowing into the port, a voltage at the port, or any other electrical characteristic. Accordingly, monitoring circuit 216 may be configured to measure one or more of these parameters and generate a value representing the parameter.

Next (step 506), a reference range is selected based on the state of the port. For example, in step 506, processor 204 may obtain from storage unit 206 a min and a max value associated with the determined state of the port. The min and max value may define the reference range. Alternatively, in step 506, processor 204 may obtain from storage unit 206 a single value associated with the determined stat of the port from which the reference range may be derived.

Next (step 508), processor 204 determines whether the value (V) obtained in step 504 falls within the selected reference range. For example, processor 204 may compare value (V) to min threshold value and a max threshold value, which together define the selected reference range. If V does not fall within the selected reference range, then an alarm may be issued (step 510). For example, the step of issuing the alarm may include activating a light source and/or a sound source so as to inform a user of gateway 102 that a problem may exist. In addition to issuing an alarm, the gateway 102 may automatically reset itself (e.g., cycle power). However, in some embodiments, to avoid a loop condition in which the device continually performs an automatic reset, the device is configured such that it will resent only once or only once every, for example, 15 minutes. After the gateway 102 performs an automatic power cycle, the initial reference range that is used to monitor the ports 104 may be set to some pre-defined default values.

If the value (V) falls within the reference range, then process 500 may proceed to step 512. In step 512, processor 204 selects a data structure (e.g., a queue or a buffer) associated with the port and with the state determined in step 502. Next (step 514), processor stores the value (V) in the data structure. The data structure may be a circular buffer of size N, so that the data structure stores only the last N measured values for the particular state and port with which the data structure is associated.

Next (step 516), processor 204 determines whether the port has transitioned a new state. If not, process 500 proceeds back to step 504, otherwise it proceeds to step 518. In step 518, the current state of the port is determined. Next (step 520), processor 204 determines whether a call has completed successfully. A call can be assumed to have completed successfully if the port proceeds through all necessary call states during either call termination (ringing, off-hook, transmission, on-hook, and idle) or call origination (off-hook, dialing, transmission, on-hook, idle). If a call has not been completed, process 500 proceeds back to step 504, otherwise it proceeds to step 522. In step 522, processor 204 creates a new reference range for each of the certain states of the port.

Figure 6:
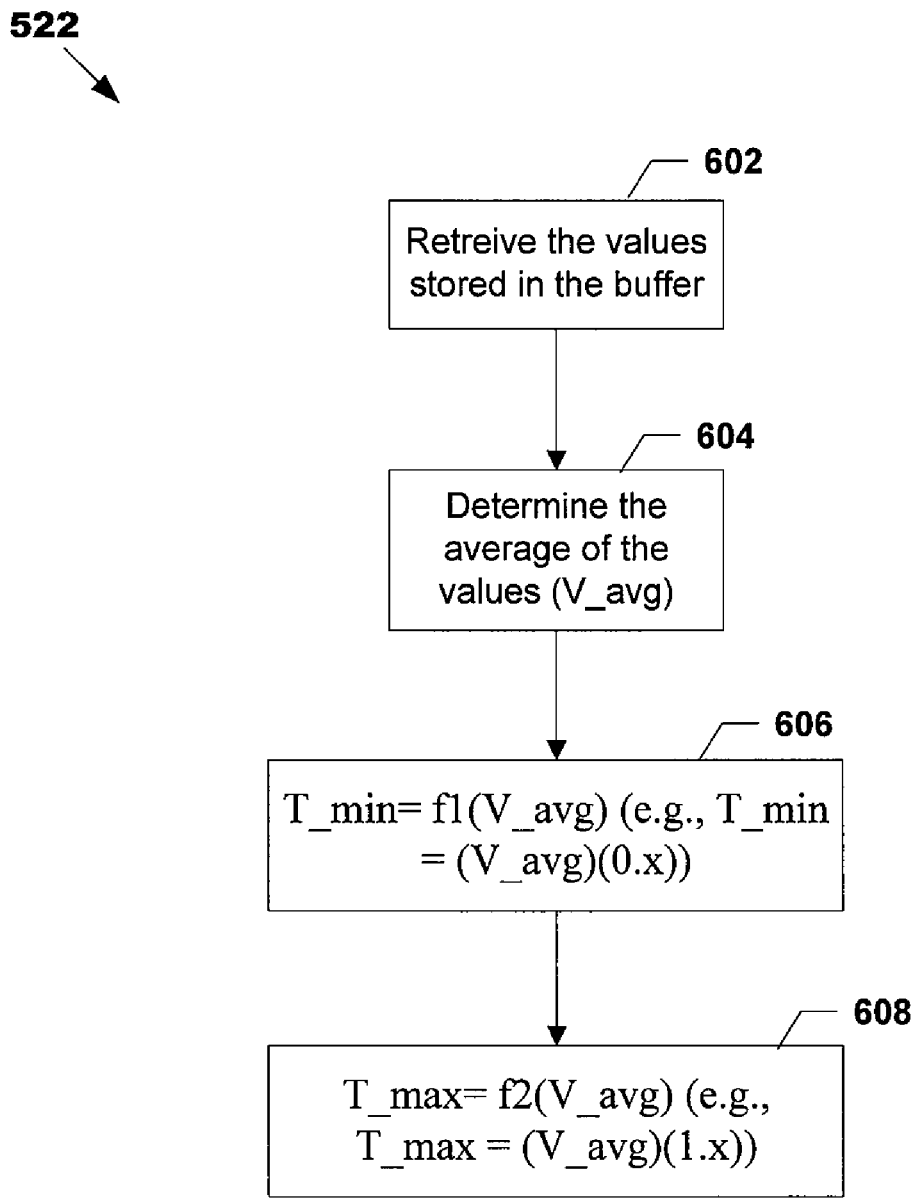
FIG. 6 is a flow chart illustrating a process for creating a new reference range.

A process for creating a new reference range for a certain state of the port is shown in FIG. 6. The process may begin in step 602, where processor 204 retrieves the values stored in the data structure associated with the state. Next (step 604), processor determines a new value based on these values (e.g., the new value may be the average or median of the values). Once this new value is determined, processor uses the new value to create a new reference range for the state. As a specific example, in step 606, processor 204 uses the new value (V_new) to generate a min threshold value (T_min), where T_min=f1(V_new). Similarly, in step 608, processor 204 uses V_new to generate a max threshold value (T_max), where T_max=f2(V_new). F1(V_new) may be defined as: V_new−(x %)(V_new)=(V_new)(0.x), and F2(V_new) may be defined as: V_new+(x %)(V_new)=(V_new)(1.x).

Figure 7:
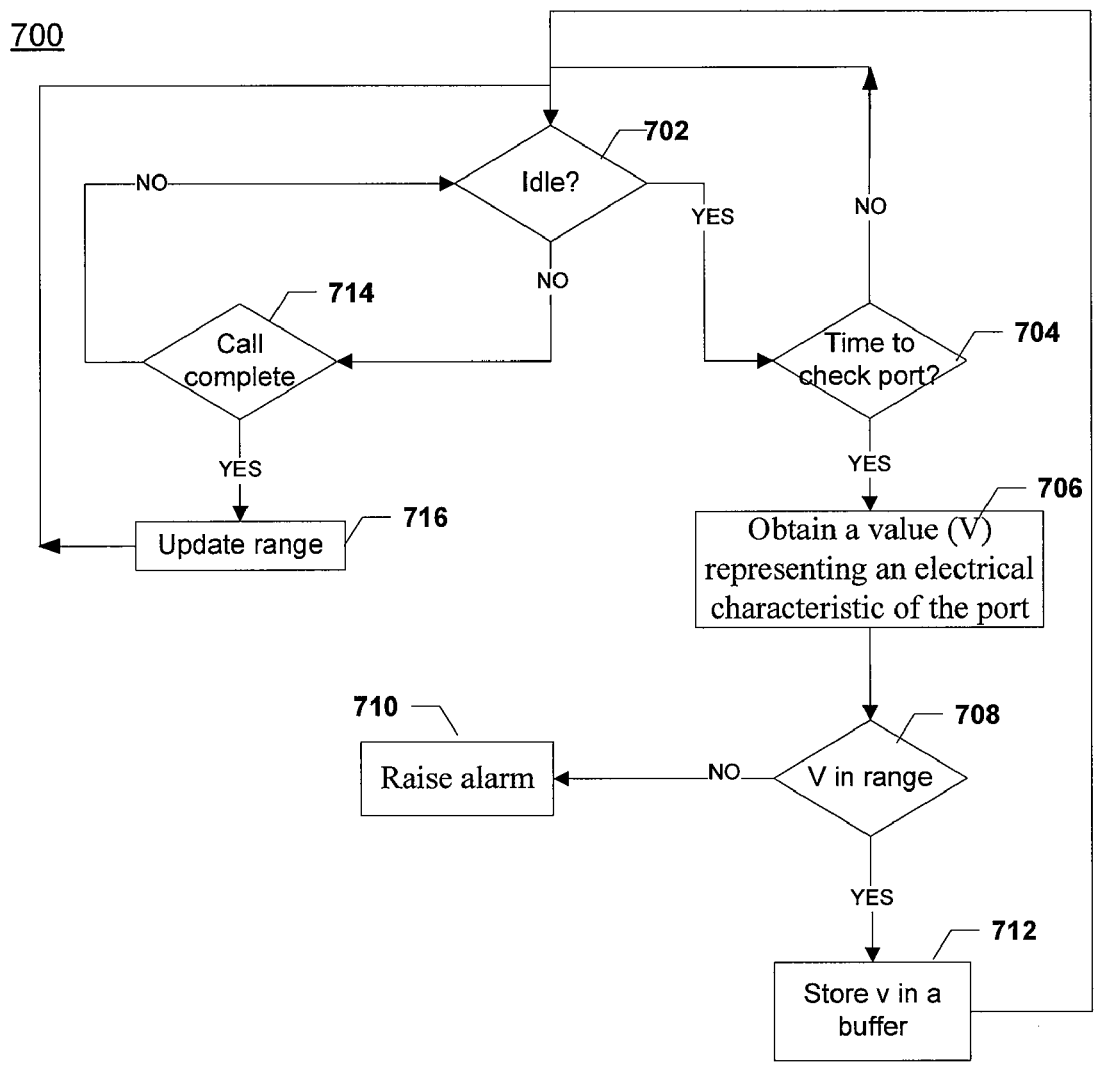
FIG. 7 is a flow chart illustrating a process for monitoring a telephone line according to an embodiment of the invention.

Referring now to FIG. 7, FIG. 7 is a flow chart illustrating a process 700, according to some embodiments, for monitoring a POTS-line port 104 of gateway 102. Process 700 may begin in step 702, where it is determined whether or not the port 104 is in an idle state. If it is, the process proceeds to step 704, otherwise it proceeds to step 714.

In step 704, a determination is made as to whether or not it is time to measure an electronic characteristic of the port. For example, in some embodiments, processing unit 202 is configured to obtain a measurement every X seconds or minutes, where X is a value greater than zero. If it is time to measure the electronic parameter, process 700 proceeds to step 706, otherwise it proceeds back to step 702.

In step 706, a value (V) representing the electrical characteristic of the port is obtained. For example, processor 204 may obtain the value from monitoring circuit 216. The electrical characteristic may be one of an impedance seen at the port, a current flowing into the port, and a voltage at the port. Accordingly, monitoring circuit 216 may be configured to measure one or more of these parameters and generate a value representing the parameter.

Next (step 708), a determination is made as to whether the value (V) obtained in step 706 falls within a predetermined reference range. For example, processor 204 may compare value (V) to min threshold value and a max threshold value, which together define the reference range. If V does not fall within the selected reference range, then an alarm may be issued (step 710). If, on the other hand, the value (V) falls within the reference range, then process 700 may proceed to step 712. In step 712, the value (V) is stored in a data structure associated with the port. The data structure may be a circular buffer of size N, so that the data structure stores only the last N obtained values for port with which the data structure is associated. After step 712, the process returns to step 702.

In step 714, a determination is made as to whether a call has completed successfully. If not, the process proceeds back to step 702, otherwise it proceeds to step 716. In step 716, a new reference range is created using values stored in the above mentioned data structure. A process of creating the new reference range is described above with reference to FIG. 6.

The above described adaptive monitoring scheme is advantageous because it uses an adaptive reference range rather than a fixed reference range. Using a fixed reference range for all situations would likely lead to excessive false alarms in some cases and/or significant under-reporting of problems in other cases. Additionally, problems associated with dormant failures are reduced because, as described above, in some embodiments the lines are monitored automatically and periodically. This constant supervision means that it is unlikely the gateway will "silently die" due to failure in the local telephony network. Accordingly, embodiments of the present invention prevent the situation where the user does not discover that there is a problem until the user goes to use his/her telephone.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be rearranged.

What is claimed is:

1. A method of monitoring a telephone line connected to a port of a voice gateway, comprising:
   obtaining a value representing an electrical characteristic of the port of the voice gateway;
   determining whether the value is within an acceptable range;
   determining whether a call originating from, or terminated at, a device connected to the telephone line completed successfully; and
   in response to determining that the call completed successfully, creating a new acceptable range based, at least in part, on the obtained value.

2. The method of claim 1, further comprising issuing an alarm in response to determining that the value is not within the acceptable range.

3. The method of claim 2, wherein the step of issuing an alarm comprises activating a light source and/or a sound source.

4. The method of claim 1, wherein the step of determining whether the value is within the acceptable range comprises comparing the value to a max threshold value and to a min threshold value.

5. The method of claim 1, further comprising:
after creating the new acceptable range, obtaining a second value representing the electrical characteristic at the port of the voice gateway;
determining whether the second value is within the new acceptable range; and
issuing an alarm in response to determining that the second value is not within the new acceptable range.

6. The method of claim 1, wherein the electrical characteristic is one of an impedance seen at the port, a current flowing into the port, and a voltage at the port.

7. The method of claim 6, wherein the step of obtaining the value comprises measuring the electrical characteristic while the telephone line is in an idle state.

8. The method of claim 6, wherein the step of obtaining the value comprises measuring the electrical characteristic while the telephone line is in a transmission state.

9. The method of claim 6, wherein the step of obtaining the value comprises measuring the electrical characteristic while the telephone line is in a ringing state.

10. The method of claim 6, further comprising obtaining a plurality of values representing the electrical characteristic, wherein the step of obtaining the plurality of values comprises obtaining a value representing the electrical characteristic at least once every X amount of time while the telephone line is in an idle state.

11. The method of claim 10, wherein the new acceptable range is a function of said plurality of values.

12. The method of claim 11, wherein the new acceptable range is a function of the average of the plurality of values.

13. The method of claim 12, wherein the new acceptable range is bounded by a max value and a min value, wherein the max value is equal to the average of the plurality of values plus a percentage of the average and the min value is equal to the average of the plurality of values minus a percentage of the average.

14. A voice gateway, comprising:
a telephone port for interfacing with an analog telephone line;
a network port for interfacing with a network;
a processing unit; and
a circuit for monitoring the telephone port, wherein
the circuit for monitoring the telephone port is configured to generate a value representing an electrical characteristic at the telephone port, and
the processing unit is configured to: (1) receive the value and determine whether the value is within an acceptable range; (2) determine whether a call originating from, or terminated at, a device connected to the telephone port completed successfully; and (3) create a new acceptable range based, at least in part, on the value in response to determining that the call completed successfully.

15. The voice gateway of claim 14, wherein the processing unit is further configured to issue an alarm in response to determining that the value is not within the acceptable range.

16. The voice gateway of claim 14, wherein the processing unit is configured to determine whether the value is within the acceptable range by comparing the value to a max threshold value and to a min threshold value.

17. The voice gateway of claim 14, wherein the processing unit is further configured to:
obtain a second value representing the electrical characteristic at the port after creating the new acceptable range;
determine whether the second value is within the new acceptable range; and
issue an alarm in response to determining that the second value is not within the new acceptable range.

18. The voice gateway of claim 14, wherein the electrical characteristic is one of an impedance seen at the port, a current flowing into the port, and a voltage at the port.

19. The voice gateway of claim 18, wherein the circuit is configured to generate the value while the telephone line is in an idle state.

20. The voice gateway of claim 18, wherein the circuit is configured to generate the value while the telephone line is in a transmission state.

21. The voice gateway of claim 18, wherein the circuit is configured to generate the value while the telephone line is in a ringing state.

22. The voice gateway of claim 18, wherein the processing unit is further configured to obtain a plurality of values representing the electrical characteristic by obtaining a value representing the electrical characteristic at least once every X amount of time while the telephone line is in an idle state.

23. The voice gateway of claim 22, wherein the new acceptable range is a function of said plurality of values.

24. The voice gateway of claim 23, wherein the new acceptable range is a function of the average of the plurality of values.

25. The voice gateway of claim 24, wherein the new acceptable range is bounded by a max value and a min value, wherein the max value is equal to the average of the plurality of values plus a percentage of the average and the min value is equal to the average of the plurality of values minus a percentage of the average.

26. A voice gateway, comprising:
a port for interfacing with a telephone line;
a circuit for generating a value representing an electrical characteristic at the port; and
a processing unit coupled to the circuit, the processing unit comprising a storage unit storing a set of computer instructions, the set of computer instructions comprising:
computer instructions for determining whether the value is within an acceptable range;
computer instructions for determining whether a call originating from, or terminated at, a device connected to the telephone line completed successfully; and
computer instructions for creating a new acceptable range based, at least in part, on the value in response to a determination that the call completed successfully.

27. The voice gateway of claim 26, wherein the set of computer instructions further includes computer instructions for issuing an alarm in response to determining that the value is not within the acceptable range.

28. The voice gateway of claim 26, wherein the computer instructions for determining whether the value is within the acceptable range comprises computer instructions for comparing the value to a max threshold value and to a min threshold value.

29. The voice gateway of claim 26, wherein the set of computer instructions further comprises:
computer instructions for obtaining a second value representing the electrical characteristic at the port of the voice gateway after creating the new acceptable range;
computer instructions for determining whether the second value is within the new acceptable range; and
computer instructions for issuing an alarm in response to a determination that the second value is not within the new acceptable range.

30. The voice gateway of claim 26, wherein the electrical characteristic is one of an impedance seen at the port, a current flowing into the port, and a voltage at the port.

31. The voice gateway of claim 30, wherein the circuit is configured to generate the value while the port is in an idle state.

32. The voice gateway of claim 30, wherein the circuit is configured to generate the value while the port is in a transmission state.

33. The voice gateway of claim 30, wherein the circuit is configured to generate the value while the port is in a ringing state.

34. The voice gateway of claim 26, wherein the set of computer instructions further comprises computer instructions for obtaining a plurality of values representing the electrical characteristic, wherein the computer instructions for obtaining the plurality of values comprises computer instructions for obtaining a value representing the electrical characteristic at least once every X minutes while the telephone line is in an idle state.

35. The voice gateway of claim 34, wherein the new acceptable range is a function of said plurality of values.

36. The voice gateway of claim 35, wherein the new acceptable range is a function of the average of the plurality of values.

37. The voice gateway of claim 36, wherein the new acceptable range is bounded by a max value and a min value, wherein the max value is equal to the average of the plurality of values plus a percentage of the average and the min value is equal to the average of the plurality of values minus a percentage of the average.

* * * * *

UNITED STATES PATENT AND TRADEMARK OFFICE
CERTIFICATE OF CORRECTION

| | | |
|---|---|---|
| PATENT NO. | : 8,160,208 B2 | Page 1 of 1 |
| APPLICATION NO. | : 12/200138 | |
| DATED | : April 17, 2012 | |
| INVENTOR(S) | : Skoglund | |

It is certified that error appears in the above-identified patent and that said Letters Patent is hereby corrected as shown below:

In the Specifications:

In Column 4, Line 25, delete "(e.q.," and insert -- (e.g., --, therefor.

Signed and Sealed this
Twenty-fifth Day of September, 2012

David J. Kappos
*Director of the United States Patent and Trademark Office*